Figure 9:
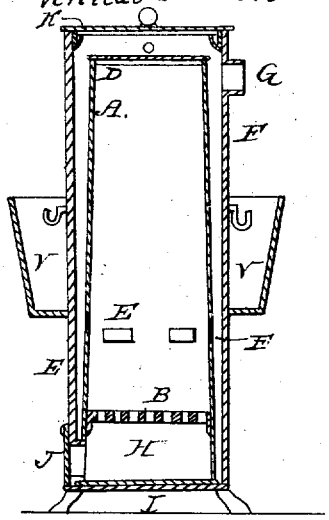
Figure 3:
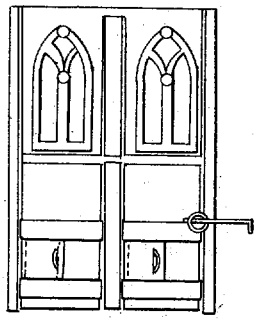
Figure 10:
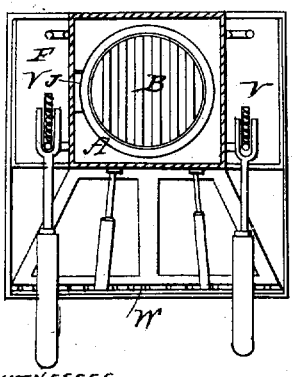
Figure 11:
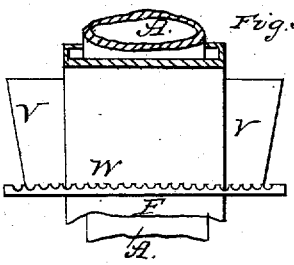

2 Sheets—Sheet 1.
D. G. LITTLEFIELD.
Stove.
No. 1,334. Reissued Aug. 26, 1862.
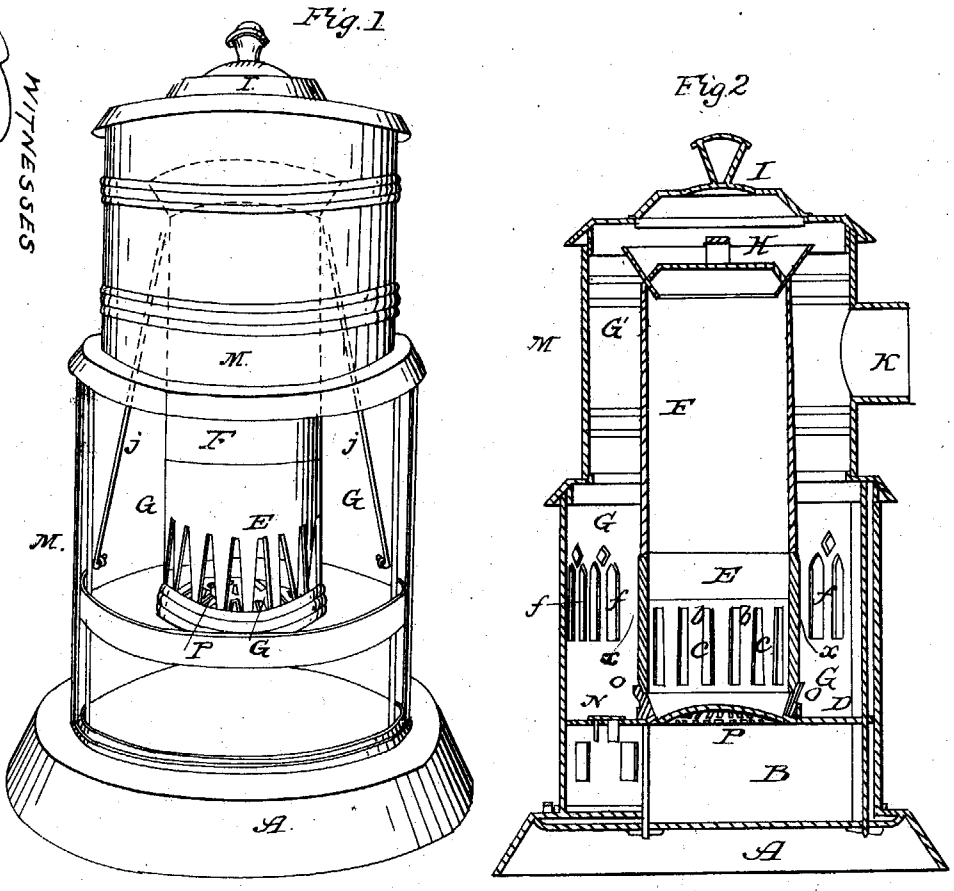
WITNESSES
Franklin Fox
Marcus P. Norton
INVENTOR
Dennis G. Littlefield
N. PETERS. Photo-Lithographer, Washington, D. C.

2 Sheets—Sheet 2.

D. G. LITTLEFIELD

Stove.

No. 1,334.

Reissued Aug. 26, 1862.

vertical section

Front elevation of the Stove

WITNESSES
Franklin Pratt
Marcus P. Norton

INVENTOR
Dennis G. Littlefield

N. PETERS, Photo-Lithographer, Washington, D. C.

UNITED STATES PATENT OFFICE.

DENNIS G. LITTLEFIELD, OF ALBANY, NEW YORK.

IMPROVEMENT IN STOVES.

Specification forming part of Letters Patent No. 10,448, dated January 24, 1854; Reissue No. 1,236, dated November 19, 1861; Reissue No. 1,334, dated August 26, 1862.

DIVISION No. 1.

*To all whom it may concern:*

Be it known that I, DENNIS G. LITTLEFIELD, of the city of Albany, county of Albany, and State of New York, did, on or about the 24th day of January, 1854, obtain of and from the United States of America certain Letters Patent for and upon a new method of constructing that class of stoves using a supplying-cylinder for the reserve coal, which said patent was duly reissued in two separate divisions or patents on the 19th day of November, 1861; and I do hereby declare that the following is a full and exact description of my invention, reference being had to the accompanying drawings, and to the letters of reference marked thereon.

Like letters represent and refer to like or corresponding parts.

Figure 1 is a view of a cylindrical stove, a part of the outer cylinder and the doors being removed. Fig. 2 is a central vertical section of the same.

My invention has reference to that class of stoves having a supplying-reservoir for the reserve fuel, and is adapted for the combustion of anthracite or hard coal, and supplied upwardly, from below the entire mass, with air to support combustion thereof. It is of a twofold nature: first, causing the combustion of the gases from the supply-coal and the gases from the incandescent coal to take place at the exterior surface near the base, so as to aid in the combustion of the solid, unconsumed coals at that point; and, second, so adapting the supplying-reservoir and the flue surrounding it to the fire-pot as to entirely prevent any air passing into said reservior when the stove is in action, except at the base—a device that may with propriety be denominated a "base-burning stove," which, having the same conditions within it at all times, so far as to the supply-coal, can be regulated in its action entirely by the amount of air permitted to pass upwardly to the incandescent coal on the fire-grate at the bottom of the fire-pot.

Having thus described the nature of my invention, and to enable others skilled in the art to make and use the same, I will here proceed to describe the construction thereof, which is as follows, to wit: The base A and the outer cylinder, M, may be of any convenient form or size. The said cylinder M has a close-fitting cover, I, at the top thereof. It also contains a draft flue, K, for the passage of the smoke and spent gases out from the stove.

G and G′ is a smoke and spent-gas passage or chamber connecting with the exit-pipe K, surrounding the top and sides of a coal-supply chamber, F, and prevents the entrance of air into the said chamber F through the openings in the top of the outer wall, M, and the top of the said coal-supply chamber, into which openings are closely fitted covers I and H, respectively. Within the said outer wall, M, is a coal-supply chamber, F, having a close fitting cover, as aforesaid. This chamber is suspended over a fire-pot, E, into which it is fitted, and firmly held by means of the rods *j*, Fig. 1. The said fire pot is open at its bottom. It has also suitable openings at its sides, which extend from its lower end upward to any distance required, for the purpose of igniting and facilitating the consumption of the coal above the grate at the lower end thereof and below the said vertical fire-grate. These vertical openings in the sides of the said fire-pot E may be of any form or size desired to aid or facilitate the draft of air through the burning mass of coal within said fire-pot, upon and near the fire-grate at the lower end thereof. The air entering below the said fire-grate passes upward through the same into the fire above, and out at said openings on all sides of said fire-pot and below said coal-supply chamber. A portion of the gases generated by the incandescent coal on the said fire-grate, as well as the gases expelled from the heated superincumbent coal in said coal-supply chamber, are temporarily confined in said coal-supply chamber until, becoming sufficiently heated and expanded, they are forced down the said chamber, and find egress through the said vertical openings, previous to which they are met by the current or draft of air aforesaid, which, meeting thus, commingle and ignite with the outer mass of incandescent coal on the said fire-grate, and together pass in this condition below the said supply-chamber, and into the said chamber G, thus and thereby causing a bright light and an intense heat within the said chamber G at its lowest available point—to wit, the base of the stove. The descent of the gases from the said supply-chamber and the ascent of the draft of air up through the said fire-grate being each drawn away laterally on all sides from a common center—to wit, the vertical axis of the stove, by reason of the draft through the exit-pipe K and surrounding chamber G—causes the gas and air currents to spread from the center of the mass of incandescent coal on the said fire-grate, and thus in an ignited condition infuse themselves thoroughly in contact with all parts of the mass of coal surrounding such center. By these means the whole mass of incandescent coal becomes thoroughly consumed upon the said fire grate and the gases utilized to form a bright and cheerful flame as well as an intense heat within the chamber G at or near the base of the stove and in close proximity to the outer wall, M. The gases thus utilized and spent pass up the said chamber G, around and over the top of the said supply-chamber F within the said chamber G and G′, thence out at the exit-pipe K.

Having thus described my invention, what I claim, and desire to secure by Letters Patent, is—

An organization which will permit the gases of the supply-coal and the gases of the incandescent coal to burn laterally below and outside of the coal-supply chamber and entirely down to the grate, and thereafter circulate the spent gases, or a portion of them, over the top of the coal-supply chamber, and finally discharge them through a flue leading outside the room in which the stove is situated.

DENNIS G. LITTLEFIELD.

Witnesses:
JAMES B. SANDERS,
A. V. DE WITT.